(12) United States Patent
Hamakubo

(10) Patent No.: US 9,777,136 B2
(45) Date of Patent: Oct. 3, 2017

(54) RUBBER COMPOSITION AND RUBBER MOLDED ARTICLE USING THE SAME

(71) Applicant: SUMITOMO RUBBER INDUSTRIES, LTD., Kobe-shi, Hyogo (JP)

(72) Inventor: Masashi Hamakubo, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 14/829,277

(22) Filed: Aug. 18, 2015

(65) Prior Publication Data

US 2016/0075859 A1   Mar. 17, 2016

(30) Foreign Application Priority Data

Sep. 17, 2014  (JP) ................................. 2014-189058
Jan. 7, 2015   (JP) ................................. 2015-001755

(51) Int. Cl.
| | |
|---|---|
| *C08K 5/19* | (2006.01) |
| *C08K 5/14* | (2006.01) |
| *C08K 3/36* | (2006.01) |
| *C08J 3/20* | (2006.01) |

(52) U.S. Cl.
CPC ................. *C08K 5/19* (2013.01); *C08J 3/203* (2013.01); *C08K 3/36* (2013.01); *C08K 5/14* (2013.01); *C08J 2323/16* (2013.01)

(58) Field of Classification Search
CPC ............ G03G 15/16; H01B 1/24; C08K 5/19; C08K 5/14; C08K 3/36
USPC .......................................................... 524/394
See application file for complete search history.

(56) References Cited

U.S. PATENT DOCUMENTS

| | | | | |
|---|---|---|---|---|
| 5,893,821 | A | * | 4/1999 | Ando ...................... B29C 44/04 |
| | | | | 492/39 |
| 2004/0260006 | A1 | * | 12/2004 | Mabuchi ................. C08L 21/00 |
| | | | | 524/502 |
| 2006/0082042 | A1 | * | 4/2006 | Ito ........................ B65H 3/0638 |
| | | | | 271/109 |

FOREIGN PATENT DOCUMENTS

| | | | |
|---|---|---|---|
| JP | 2003-107932 | * | 4/2003 |
| JP | 2003-107932 A | | 4/2003 |

* cited by examiner

*Primary Examiner* — Deve E Valdez
(74) *Attorney, Agent, or Firm* — Birch, Stewart, Kolasch & Birch, LLP

(57) ABSTRACT

A rubber composition according to the present invention includes at least a rubber component, which includes an ethylene propylene diene rubber, a peroxide crosslinking agent, and amorphous silica and further includes not less than 0.3 parts by mass of a quaternary ammonium salt with respect to 100 parts by mass of the amorphous silica. A rubber molded article according to the present invention is constituted of the rubber composition.

2 Claims, 1 Drawing Sheet

RUBBER COMPOSITION AND RUBBER MOLDED ARTICLE USING THE SAME

CROSS-REFERENCE TO RELATED APPLICATIONS

The present application corresponds to Japanese Patent Application No. 2014-189058 filed on Sep. 17, 2014 in the Japan Patent Office and to Japanese Patent Application No. 2015-001755 filed on Jan. 7, 2015 in the Japan Patent Office, and the entire disclosures of these applications are incorporated herein by reference.

FIELD OF THE INVENTION

The present invention relates to a rubber composition and a rubber molded article using the same, such as a paper feeding roller, etc.

BACKGROUND ART

Although carbon black is generally used as a reinforcing agent for rubber, carbon black is black in color as its name indicates, a rubber molded article thus basically becomes black in color, and carbon black is thus unsuitable for manufacturing a rubber molded article of a pale color, such as a white color, etc., or any color besides black.

In particular among rubber molded articles, a paper feeding roller is used by being incorporated, for example, in a laser printer or other image forming apparatus making use of electrophotography, ink-jet printer, or an automatic teller machine (ATM), etc., and therefore being black in color tends to be shunned to prevent soiling of paper due to a rubbing mark.

Although decreasing the blending proportion of carbon black may be considered to reduce the influence of the color of carbon black, in this case, there is a problem that the reinforcing effect becomes insufficient so as to cause degradation, in particular, of mechanical characteristics, for example, tensile characteristics, such as tensile strength, elongation at break, etc., strain resistance characteristics, such as compression set, tension set, etc., of a rubber molded article.

It is thus being examined that amorphous silica, which, as a white reinforcing agent, exhibits the highest reinforcing effect, be blended in place of carbon black or together with carbon black or another reinforcing agent or filler, etc., such as titanium oxide, etc.

Also, a paper feeding roller is, for example, required to be excellent in ozone resistance, weather resistance, etc., for use inside an image forming apparatus and is required to be excellent in weather resistance, heat-aging resistance, cold resistance, low temperature characteristics, etc., in order to exhibit stable performance in an ATM, etc., that is installed in various locations, and is thus frequently formed of an ethylene propylene diene rubber (EPDM), which is excellent in these characteristics.

However, when, in particular, amorphous silica is blended as a reinforcing agent in a system using EPDM as a rubber and a peroxide crosslinking agent as a crosslinking agent, another new problem arises in that the amorphous silica inhibits the crosslinking of the EPDM by the peroxide crosslinking agent so that crosslinking does not occur at all or crosslinking occurs insufficiently and consequently, a rubber molded article having the required mechanical characteristics cannot be obtained.

BRIEF SUMMARY OF THE INVENTION

An object of the present invention is to provide a novel rubber composition that includes at least an EPDM as a rubber component, is constituted using a peroxide crosslinking agent as a crosslinking agent and blending at least amorphous silica as a reinforcing agent, is capable of being colored to a pale color, such as a white color, etc., or any color besides black, and enables forming of a rubber molded article of excellent mechanical characteristics due to crosslinking of the EPDM not being inhibited, and a rubber molded article formed using the rubber composition.

The present invention provides a rubber composition including at least a rubber component, which includes an EPDM, a peroxide crosslinking agent, and amorphous silica and further including not less than 0.3 parts by mass of a quaternary ammonium salt with respect to 100 parts by mass of the amorphous silica.

The present invention also provides a rubber molded article constituted of the rubber composition according to the present invention.

ADVANTAGEOUS EFFECTS OF INVENTION

By present invention, a novel rubber composition that includes at least an EPDM as a rubber component, is constituted using a peroxide crosslinking agent as a crosslinking agent and blending at least amorphous silica as a reinforcing agent, is capable of being colored to a pale color, such as a white color, etc., or any color besides black, and enables forming of a rubber molded article of excellent mechanical characteristics due to crosslinking of the EPDM not being inhibited, and a rubber molded article formed using the rubber composition can be provided.

DESCRIPTION OF EMBODIMENTS

<<Rubber Composition>>

Figure 1:
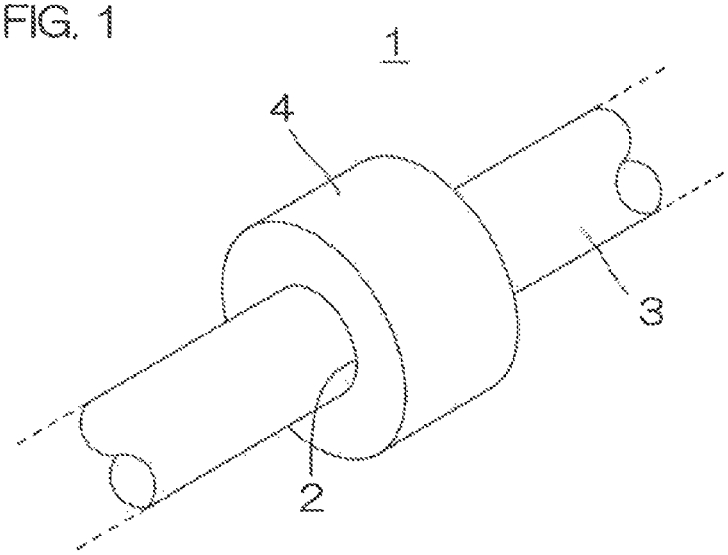
FIG. 1 is a perspective view of a paper feeding roller as an example of a preferred embodiment of a rubber molded article according to the present invention.

As mentioned above, the rubber composition according to the present invention is characterized in including at least the rubber component that includes the EPDM, the peroxide crosslinking agent, and the amorphous silica and further including not less than 0.3 parts by mass of the quaternary ammonium salt with respect to 100 parts by mass of the amorphous silica.

With the present invention, by further blending the quaternary ammonium salt at the prescribed proportion in the system including at least the rubber component that includes the EPDM as mentioned above, the peroxide crosslinking agent, and the amorphous silica as the reinforcing agent, the amorphous silica is suppressed from inhibiting the crosslinking of the EPDM by the peroxide crosslinking agent, thereby enabling the EPDM to be crosslinked sufficiently.

Although the reason for this is not clear, it is considered that the quaternary ammonium salt acts on the surface of the amorphous silica to hide groups, present on the surface, that express an inhibiting action.

Therefore with the present invention, the use of the amorphous silica as the reinforcing agent makes possible the providing of a novel rubber composition that is capable of being colored to a pale color, such as a white color, etc., or any color besides black and enables forming of a rubber molded article of excellent mechanical characteristics due to crosslinking of the EPDM not being inhibited by the amorphous silica, and a rubber molded article formed using the rubber composition can be provided.

In Patent Document 1 (Japanese Patent Application Publication No. 2003-107932), it is described that a peroxide based crosslinking agent, carbon black, silica, and a quaternary ammonium salt be blended with a rubber component. However, the quaternary ammonium salt is blended as a conductivity imparting agent (paragraph [0015]) and also the silica is blended not as a reinforcing agent but as a volume resistivity adjusting agent (paragraph [0012]). The reinforcing agent is carbon black (paragraph [0031]) and the rubber molded article thus takes on a black color.

Moreover, to begin with, an effect is actually verified just in regard to a millable urethane rubber in Patent Document 1 and Patent Document 1 makes no mention whatsoever in regard to inhibition, due to silica, of crosslinking of the EPDM by a peroxide crosslinking agent, prevention thereof by blending of a quaternary ammonium salt, etc.

<EPDM>

As the EPDM, any of various EPDMs, with which a small amount of a third component (diene component) is added to ethylene and propylene to introduce a double bond into the main chain, may be used.

As the EPDM, various products differing, for example, in the type and amount of the third component are provided. As representative examples of the third component, ethylidene norbornene (ENB), 1,4-hexadiene (1,4-HD), dicyclopentadiene (DCP), etc., can be cited.

Also, although as EPDMs, there are those of an oil-extended type that are adjusted in flexibility by addition of an extender oil and those of a non-oil-extended type without oil added, either type of EPDM may be used in the present invention.

One type or two or more types of such EPDMs may be used.

<Other Rubber Components>

As the rubber component, it is preferable to use the EPDM alone (including a case where two or more types of EPDM are used in combination) in terms of the above-described effect of improving the ozone resistance, etc., of a paper feeding roller or other rubber molded article and in terms of simplifying the arrangement to achieve cost reduction.

However, another rubber component may be used in combination.

As an example of the other rubber component, one type or two or more types among natural rubbers, isoprene rubbers (IR), styrene butadiene rubbers (SBR), etc., can be cited. Also, although as SBRs, there are those of an oil-extended type that are adjusted in flexibility by addition of an extender oil and those of a non-oil-extended type without oil added, either type may be used in the present invention.

When these other rubber components are used in combination, for example, with a paper feeding roller, decrease of friction coefficient μ due to accumulation of paper dust upon repeated paper feeding can be suppressed and wear resistance can be improved.

If another rubber component is used in combination, the blending proportion thereof is preferably not more than 50 parts by mass and especially preferably not more than 40 parts by mass with respect to 100 parts by mass of the total amount of the rubber components.

If the blending proportion of the other rubber component exceeds this range, the proportion of the EPDM is made low relatively and the effect of improving the ozone resistance, etc., of the rubber molded article due to the use of the EPDM may be insufficient.

However in consideration of satisfactorily expressing the above-described effects due to combined use of the other rubber component, the blending proportion of the other rubber component within the above range is preferably not less than 5 parts by mass and especially preferably not less than parts by mass with respect to 100 parts by mass of the total amount of the rubber components.

<Peroxide Crosslinking Agent>

As an example of the peroxide crosslinking agent, one type or two or more types among benzoyl peroxide, 1,1-bis(tert-butylperoxy)-3,3,5-trimethylcyclohexane, 2,5-dimethyl-2,5-di(benzoylperoxy)hexane, di(tert-butylperoxy)diisopropylbenzene, 1,4-bis[(tert-butyl)peroxyisopropyl]benzene, di(tert-butylperoxy)benzoate, tert-butyl peroxybenzoate, dicumyl peroxide (DCP), tert-butyl cumyl peroxide, 2,5-dimethyl-2,5-di(tert-butylperoxy)hexane, di-tert-butyl peroxide, 2,5-dimethyl-2,5-di(tert-butylperoxy)-3-hexene, etc., can be cited.

The blending proportion of the peroxide crosslinking agent is preferably not less than 1 part by mass and preferably not more than 10 parts by mass and especially preferably not more than 5 parts by mass with respect to 100 parts by mass of the total amount of the rubber components.

If the blending proportion of the peroxide crosslinking agent is below this range, the crosslinking may be insufficient and it may not be possible to form a satisfactory rubber molded article having appropriate mechanical characteristics.

On the other hand, even if the blending proportion of the peroxide crosslinking agent exceeds the above range, a further effect cannot be obtained and moreover, scorching may occur during processing or molding.

In contrast, by setting the blending proportion of the peroxide crosslinking agent within the above range, a paper feeding roller or other rubber molded article that is excellent in mechanical characteristics due to being crosslinked sufficiently can be formed without causing scorching, etc.

If the EPDM alone is to be used as the rubber component, the blending proportion of the peroxide crosslinking agent with respect to 100 parts by mass of the EPDM is set within the above range. Also, if the EPDM used alone is an oil-extended EPDM, the blending proportion of the peroxide crosslinking agent with respect to 100 parts by mass of solids (EPDM) in the oil-extended EPDM is set within the above range. The same applies to the respective components below besides the quaternary ammonium salt.

<Amorphous Silica>

As the amorphous silica, either of wet process silica and dry process silica, which are classified by the production method, may be used. Amorphous silica that has been subject to a hydrophobic treatment may also be used.

As specific examples of the amorphous silica, various types of amorphous silica of the Nipsil (registered trademark) series manufactured by Tosoh Silica Corporation, various types of amorphous silica of the AEROSIL (registered trademark) series manufactured by Nippon Aerosil Co., Ltd., etc., can be cited.

The blending proportion of the amorphous silica is preferably not less than 1 part by mass and especially preferably not less than 10 parts by mass and preferably not more than 100 parts by mass and especially preferably not more than 80 parts by mass with respect to 100 parts by mass of the total amount of the rubber components.

If the blending proportion of the amorphous silica is below this range, the reinforcing effect due to blending the amorphous silica may be insufficient and the mechanical characteristics of the rubber molded article may degrade. Specifically, for example, the tensile strength, elongation at break, etc., may degrade.

On the other hand, if the blending proportion of the amorphous silica exceeds the above range, the viscosity of the rubber composition may become too high and make molding difficult. Also, particularly in the case of use as a paper feed roller, the compression set and tension set may become so high as to cause a defect, such as deformation due to press contact, idle rotation, etc.

In contrast, by setting the blending proportion of the amorphous silica within the above range, a paper feeding roller or other rubber molded article that is more excellent in mechanical characteristics can be formed while keeping the viscosity of the rubber composition appropriate.

<Other Reinforcing Agent or Filler>

With the rubber composition according to the present invention, the amorphous silica may be used alone (including a case where two or more types of amorphous silica are used in combination) as the reinforcing agent or another reinforcing agent or filler may be used in combination with the amorphous silica.

As an example of the other reinforcing agent or filler, one type or two or more types among carbon black, titanium oxide, calcium carbonate, zinc oxide, a silica based compound besides amorphous silica, clay, talc, magnesium carbonate, aluminum hydroxide, etc., can be cited.

Among the above, as the carbon black, any of various grades of carbon black capable of functioning as a rubber reinforcing agent may be used.

As the titanium oxide, either of anatase type and rutile type titanium oxide, which are classified by the crystal structure, may be used.

As the calcium carbonate, soft calcium carbonate, heavy calcium carbonate, precipitated calcium carbonate, surface-treated precipitated calcium carbonate, etc., can be cited.

If any of the other reinforcing agents and fillers mentioned above is to be used in combination, the blending proportion of the amorphous silica, although dependent on the reinforcing agent or filler combined with, is preferably not less than 45% by mass and especially preferably not less than 75% by mass of the total amount of reinforcing agents and fillers in consideration of making the reinforcing effect due to the amorphous silica be exhibited satisfactorily to form a rubber product with excellent mechanical characteristics.

In regard to the reinforcing agent or filler, the amorphous silica may be used alone as described above and therefore the upper limit of the blending proportion of the amorphous silica is obviously 100% by mass.

<Quaternary Ammonium Salt>

As the quaternary ammonium salt, any of various quaternary ammonium salts having the function described above may be used.

As an example of the quaternary ammonium salt, one type or two or more types among chloride salts, bromine salts, iodine salts, etc., of ammonium ions, such as monoalkyltrimethylammonium, dialkyldimethylammonium, trialkylmonomethylammonium, tetraalkylammonium, monoalkyldimethylbenyzlammonium, etc., can be cited.

The quaternary ammonium salt may be blended alone or may be blended as a solution upon dissolution in water or alcohol, etc., and is especially preferably used in a solution state upon dissolution in water or alcohol, etc.

When the respective components constituting the rubber composition are blended at the prescribed proportions and kneading by an open roll, kneader, or other mixer is performed to prepare the rubber composition, the kneading temperature may not reach the melting point of the quaternary ammonium salt or higher so that lumps of the quaternary ammonium salt may remain unmelted to cause deterioration of dispersion.

When deterioration of dispersion occurs, the above-described effect of blending in the quaternary ammonium salt may be insufficient and it may not be possible to form a satisfactory rubber molded article having appropriate mechanical characteristics.

In contrast, by using the quaternary ammonium salt as a solution upon dissolution in water or alcohol, etc., as mentioned above, such a problem can be avoided and the quaternary ammonium salt can be dispersed as uniformly as possible in the rubber composition to enable a satisfactory rubber molded article having appropriate mechanical characteristics to be formed.

The blending proportion of the quaternary ammonium salt is required to be not less than 0.3 parts by mass with respect to 100 parts by mass of the amorphous silica.

If the blending proportion of the quaternary ammonium salt is below this range, the above-described effect of suppressing the amorphous silica from inhibiting the crosslinking reaction of the EPDM by the peroxide crosslinking agent may be insufficient so that the EPDM cannot be crosslinked or cannot be crosslinked sufficiently even if it can be crosslinked or foaming, etc., may occur due to heating during crosslinking and in any of these cases, it may not be possible to form a satisfactory rubber molded article having appropriate mechanical characteristics. Particularly in use as a paper feeding roller, insufficient crosslinking may cause the paper feeding roller to be high in compression set and tension set and lead to a defect, such as deformation due to press contact, idle rotation, etc.

In contrast, by setting the blending proportion of the quaternary ammonium salt within the above range, the amorphous silica can be suppressed from inhibiting the crosslinking reaction of the EPDM by the peroxide crosslinking agent, thereby enabling the EPDM to be crosslinked sufficiently and improvement of the mechanical characteristics of the rubber molded article.

Even within the above range, the blending proportion of the quaternary ammonium salt is preferably not more than parts by mass.

Even if the blending proportion of the quaternary ammonium salt exceeds the above range, a further effect cannot be obtained and moreover, excess quaternary ammonium salt may, for example, bloom on an outer peripheral surface of the paper feeding roller to cause defective paper feeding, etc.

If the quaternary ammonium salt is to be blended as a solution upon dissolving in water or alcohol, as mentioned above, the blending proportion of the effective component (the quaternary ammonium salt) in the solution is set within the above range.

<Other Components>

A crosslinking assistant may further be blended in the rubber composition.

As the crosslinking assistant, any of various compounds capable of assisting the crosslinking of the rubber component by the peroxide crosslinking agent may be used.

Citable examples of the crosslinking assistant include but are not restricted to higher esters of methacrylic acid, such as trimethylpropane trimethacrylate, and co-crosslinking agents, such as triallyl isocyanurate (TAIC), and sulfur, dibenzoylquinonedioxime, 1,2-polybutadiene, etc., may also be used.

The blending proportion of the crosslinking assistant is preferably not less than 1 part by mass and preferably not more than 10 parts by mass with respect to 100 parts by mass of the total amount of the rubber component.

Also, an anti-aging agent, oil, auxiliary processing agent, plasticizer, colorant, etc., may further be blended as necessary at any proportion in the rubber composition.

Process oil can be cited as an example of the oil. Also examples of the plasticizer, various plasticizers, such as dibutyl phthalate (DBP), dioctyl phthalate (DOP), tricresyl phosphate, etc., and various waxes, such as polar waxes, etc., can be cited. Further, as examples of auxiliary processing agents, fatty acids, such as stearic acid, etc., can be cited.

The blending proportions of the oil, etc., are set as suited in accordance with the hardness, etc., required of the rubber molded article.

If an oil-extended EPDM is to be used as the rubber component, the blending of the oil, etc., may be omitted or the blending proportions may be decreased in accordance with the amount of the extender oil.

<<Paper Feeding Roller>>

FIG. 1 is a perspective view of a paper feeding roller as an example of a preferred embodiment of a rubber molded article according to the present invention.

With reference to FIG. 1, the paper feeding roller 1 of the present example is formed by molding the rubber composition described above to a tubular shape and then performing crosslinking.

A through hole 2 with a circular cross section is provided in a center of the paper feeding roller 1 and a cylindrical shaft 3 is inserted through and fixed in the through hole 2. An outer peripheral surface 4 of the paper feeding roller 1 that contacts paper is formed to a tubular shape that is concentric to the through hole 2 and the shaft 3.

For example, the shaft 3 with an outer diameter greater than an inner diameter of the through hole 2 of the paper feeding roller 1 is press fitted into the through hole 2 to fix the paper feeding roller 1 and the shaft 3 to each other so that idle rotation will not occur.

That is, a fixed drag torque (limiting torque at which idle rotation does not occur) is secured between the two components by an interference based on the diameter difference of the two components.

The shaft 3 is formed, for example, of a metal, ceramic, hard resin, etc.

A plurality of the paper feeding roller 1 may be fixed as necessary to a plurality of locations of a single shaft 3.

The paper feeding roller 1 may be manufactured by subjecting the rubber composition, for example, to molding to the tubular shape by an extrusion molding method, etc., followed by crosslinking by a press crosslinking method, etc., or to molding to the tubular shape and crosslinking by a transfer molding method, etc.

The outer peripheral surface 4 of the paper feeding roller 1 may be subject as necessary to polishing to a prescribed surface roughness or to knurling, surface texturing, etc., at any point in the manufacturing process.

Also, both ends of the paper feeding roller 1 may be cut to make the outer peripheral surface 4 be of a prescribed width.

The outer peripheral surface 4 of the paper feeding roller 1 may be coated with any coating layer. Also, the paper feeding roller 1 may be formed to a two layer structure with an outer layer at the outer peripheral surface 4 side and an inner layer at the through hole 2 side. In this case, it is preferable for at least the outer layer to be formed of any of the rubber compositions described above.

However in consideration of simplifying the structure, improving productivity, and reducing the manufacturing cost, it is preferable for the paper feeding roller 1 to have a single layer structure such as shown in FIG. 1.

Also, the paper feeding roller 1 may be a porous structure. However in consideration of forming the paper feeding roller 1 to be excellent in the effects of being unlikely to degrade in friction coefficient $\mu$, having an appropriate hardness, and being low in compression set so as to be unlikely to become recessed due to deformation even when a state of being in contact with another roller at a single location is sustained for a comparatively long period, the effect of being made low in the tension set to suppress degradation of drag torque, the further effect of improving wear resistance, etc., it is preferable that paper feeding roller 1 be practically a non-porous structure.

The through hole 2 may, depending on the usage of the paper feeding roller 1, be provided at a position that is decentered from the center of the paper feeding roller 1. Also, the outer peripheral surface 4 of the paper feeding roller 1 does not have to have the tubular shape and may have an irregular shape, such as a shape with which a portion of the outer peripheral surface 4 is notched in a planar shape, etc.

To manufacture the paper feeding roller 1 with the irregular shape, the paper feeding roller 1 with the irregular shape may be molded and crosslinked directly by the manufacturing method described above or the paper feeding roller 1 that has been manufactured to have the tubular shape may be made to have the irregular shape by post-processing.

Also, the through hole 2 of the paper feeding roller 1 that has been manufactured to have the tubular shape may be press-fitted with the shaft 3 that has been made to have a modified shape corresponding to the irregular shape of the paper feeding roller 1 to modify the shape of the paper feeding roller 1 to the irregular shape. In this case, the processability can be improved because the polishing, knurling, surface texturing, etc., of the outer peripheral surface 4 can be performed on the tubular outer peripheral surface 4 before shape modification.

EXAMPLES

Example 1

(Preparation of Rubber Composition)

An oil-extended EPDM [Esprene 670F manufactured by Sumitomo Chemical Co., Ltd., ethylene content: 66% by mass, diene content: 4.0% by mass, oil extended amount: 100 phr] was used as the rubber component.

Two hundred parts by mass [solids (EPDM): 100 parts by mass] of the oil-extended EPDM were blended with 3 parts by mass of dicumyl peroxide [Percumyl (registered trademark) D manufactured by NOF Corporation] as the peroxide crosslinking agent, 20 parts by mass of amorphous silica [Nipsil (registered trademark) VN3 manufactured by Tosoh Silica Corporation, wet process silica], and 0.2 parts by mass of a 50% aqueous solution of benzyltributylammonium chloride [BTMAC-50A manufactured by Lion Specialty Chemicals Co., Ltd.] as the quaternary ammonium salt and kneading was performed using a 3 L kneader and an open roll to prepare a rubber composition.

The blending proportion of the effective component (benzyltributylammonium chloride) in the aqueous solution was 0.1 parts by mass with respect to 100 parts by mass of the solids (EPDM) in the oil-extended EPDM and 0.5 parts by mass with respect to the 100 parts by mass of the amorphous silica.

Example 2

Besides blending 1 part by mass of a 28% aqueous solution of an alkyl (C12 to 16) trimethylammonium chloride [Arquad T-28 manufactured by Lion Specialty Chemicals Co., Ltd.] as the quaternary ammonium salt, a rubber composition was prepared in the same manner as in Example 1.

The blending proportion of the effective component (alkyl (C12 to 16) trimethylammonium chloride) in the aqueous solution was 0.28 parts by mass with respect to 100 parts by mass of the solids (EPDM) in the oil-extended EPDM and 1.4 parts by mass with respect to the 100 parts by mass of the amorphous silica.

Example 3

Besides blending 0.5 parts by mass of powder tetrabutylammonium bromide [TBAB-100A manufactured by Lion Specialty Chemicals Co., Ltd.] as the quaternary ammonium salt, a rubber composition was prepared in the same manner as in Example 1.

The blending proportion of tetrabutylammonium bromide was 0.5 parts by mass with respect to 100 parts by mass of the solids (EPDM) in the oil-extended EPDM and 2.5 parts by mass with respect to the 100 parts by mass of the amorphous silica.

Example 4

Besides setting the amount of the 50% aqueous solution of benzyltributylammonium chloride [the aforementioned BTMAC-50A manufactured by Lion Specialty Chemicals Co., Ltd.] as the quaternary ammonium salt to 2 parts by mass, a rubber composition was prepared in the same manner as in Example 1.

The blending proportion of the effective component (benzyltributylammonium chloride) in the aqueous solution was 1 part by mass with respect to 100 parts by mass of the solids (EPDM) in the oil-extended EPDM and 5 parts by mass with respect to the 100 parts by mass of the amorphous silica.

Example 5

Besides setting the amount of the 50% aqueous solution of benzyltributylammonium chloride [the aforementioned BTMAC-50A manufactured by Lion Specialty Chemicals Co., Ltd.] as the quaternary ammonium salt to 4 parts by mass, a rubber composition was prepared in the same manner as in Example 1.

The blending proportion of the effective component (benzyltributylammonium chloride) in the aqueous solution was 2 parts by mass with respect to 100 parts by mass of the solids (EPDM) in the oil-extended EPDM and 10 parts by mass with respect to the 100 parts by mass of the amorphous silica.

Comparative Example 1

Besides not blending a quaternary ammonium salt, a rubber composition was prepared in the same manner as in Example 1.

Comparative Example 2

Besides setting the amount of the powder tetrabutylammonium bromide [the aforementioned TBAB-100A manufactured by Lion Specialty Chemicals Co., Ltd.] as the quaternary ammonium salt to 0.05 parts by mass, a rubber composition was prepared in the same manner as in Example 3.

The blending proportion of tetrabutylammonium bromide was 0.05 parts by mass with respect to 100 parts by mass of the solids (EPDM) in the oil-extended EPDM and 0.25 parts by mass with respect to the 100 parts by mass of the amorphous silica.

<Evaluation of Crosslinking Behavior>

The crosslinking behaviors of the rubber compositions prepared in the Examples and Comparative Examples were measured using a rubber curemeter [CURELASTOMETER (registered trademark) 7 manufactured by JSR Trading Co., Ltd.]. The testing conditions were set to 170° C.×20 minutes and the minimum value ML (N·m) and maximum value MH (N·m) of torque were determined.

Consequently, with the rubber composition of Comparative Example 1, the torque did not increase and it was confirmed that crosslinking did not occur and the following respective tests were thus not performed.

Also, with the rubber composition of Comparative Example 2, foaming occurred in the process of press crosslinking for preparing test pieces for the following respective tests and it was therefore deemed that moldability was poor (×) and the following respective tests were thus not performed.

In contrast, with Examples 1 to 5, the moldability was satisfactory (°) and therefore the following respective tests were performed.

<Hardness Test>

With each of the rubber compositions prepared in Examples 1 to 5, press crosslinking was performed under conditions of 170° C.×20 minutes to form sheets of 2 mm thickness and three of the sheets were overlapped to form a test piece.

The test piece was used in accordance with the measurement method cited in the Japanese Industrial Standards JIS K6253-3:$_{2012}$ "Rubber, vulcanized or thermoplastic—Determination of hardness—Part 3: Durometer method" under an environment of 23±2° C. temperature and the numerical value after 3 seconds was recorded as a type A durometer hardness.

<Tensile Test>

With each of the rubber compositions prepared in Examples 1 to 5, press crosslinking was performed under conditions of 170° C.×20 minutes to form a sheet of 2 mm thickness that was then punched out to prepare a dumbbell-shaped No. 3 type test piece as defined in Japanese Industrial Standards JIS K6251:$_{2010}$ "Rubber, vulcanized or thermoplastics—Determination of tensile stress-strain properties."

Using the test piece, the tensile strength TS (MPa) and the elongation at break $E_b$ (%) were determined in a tensile test performed under an environment of 23±2° C. temperature in accordance with the test method cited in the abovementioned standards.

<Compression Set Test>

Using the respective rubber compositions prepared in Examples 1 to 5, large test pieces as defined in the Japanese Industrial Standards JIS K6262:$_{2013}$ "Rubber, vulcanized or thermoplastic—Determination of compression set at ambient, elevated or low temperatures" were prepared by press crosslinking under conditions of 170° C.×20 minutes.

Thereafter, the compression set test cited in the above-mentioned standard was performed under conditions of 70° C.×24 hours and the compression set (%) was determined.

The results of the above are shown in Table 1 and Table 2.

TABLE 1

| | | | Comparative Example 1 | Comparative Example 2 | Example 1 | Example 2 |
|---|---|---|---|---|---|---|
| Part by mass | Rubber component | EPDM | 100 | 100 | 100 | 100 |
| | Peroxide crosslinking agent | | 3 | 3 | 3 | 3 |
| | Reinforcing agent | Amorphous silica | 20 | 20 | 20 | 20 |
| | Quaternary ammonium salt (effective component) | TBAB-100A | — | 0.05 | — | — |
| | | BTMAC-50A | — | — | 0.1 | — |
| | | Arquad T-28 | — | — | — | 0.28 |
| | | With respect to 100 parts by mass of amorphous silica | — | 0.25 | 0.5 | 1.4 |
| Evaluation | Crosslinking behavior | ML (N · m) | Crosslinking did not occur. | 0.124 | 0.178 | 0.169 |
| | | MH (N · m) | | 0.271 | 0.482 | 0.487 |
| | Moldability | | — | x | ○ | ○ |
| | Type A durometer hardness | | — | — | 33 | 36 |
| | Tensile test | TS (MPa) | — | — | 7.2 | 9.1 |
| | | $E_b$ (%) | — | — | 860 | 820 |
| | Compression set (%) | | — | — | 20 | 17 |

TABLE 2

| | | | Example 3 | Example 4 | Example 5 |
|---|---|---|---|---|---|
| Part by mass | Rubber component | EPDM | 100 | 100 | 100 |
| | Peroxide crosslinking agent | | 3 | 3 | 3 |
| | Reinforcing agent | Amorphous silica | 20 | 20 | 20 |
| | Quaternary ammonium salt (effective component) | TBAB-100A | 0.5 | — | — |
| | | BTMAC-50A | — | 1 | 2 |
| | | Arquad T-28 | — | — | — |
| | | With respect to 100 parts by mass of amorphous silica | 2.5 | 5 | 10 |
| Evaluation | Crosslinking behavior | ML (N · m) | 0.168 | 0.168 | 0.162 |
| | | MH (N · m) | 0.512 | 0.466 | 0.517 |
| | Moldability | | ○ | ○ | ○ |
| | Type A durometer hardness | | 37 | 37 | 36 |
| | Tensile test | TS (MPa) | 9.2 | 8.5 | 8.3 |
| | | $E_b$ (%) | 820 | 830 | 820 |
| | Compression set (%) | | 16 | 14 | 14 |

From the results of Examples 1 to 5 and Comparative Examples 1 and 2 in Table 1 and Table 2, it was found that, with a system using an EPDM as the rubber component and using a peroxide crosslinking agent and amorphous silica, by further blending a quaternary ammonium salt at a proportion of not less than 0.3 parts by mass with respect to 100 parts by mass of the amorphous silica, the EPDM can be crosslinked satisfactorily and a rubber molded article that is excellent in mechanical characteristics, such as tensile characteristics, strain resistance characteristics, etc., can be formed.

Example 6

Oil-extended EPDM [the aforementioned Esprene 670F manufactured by Sumitomo Chemical Co., Ltd., oil extended amount: 100 phr] and IR [Nipol (registered trademark) IR2200 manufactured by Zeon Corporation] were used as the rubber components.

One hundred forty parts by mass [solids (EPDM): 70 parts by mass] of the oil-extended EPDM and 30 parts by mass of the IR were blended with 3 parts by mass of dicumyl peroxide [the aforementioned Percumyl D manufactured by NOF Corporation] as the peroxide crosslinking agent, 20 parts by mass of amorphous silica [the aforementioned Nipsil VN3 manufactured by Tosoh Silica Corporation], 0.5 parts by mass of carbon black [Diablack (registered trademark) H manufactured by Mitsubishi Chemical Corporation], 5 parts by mass of titanium oxide [SA-1 manufactured by Sakai Chemical Industries Co., Ltd., anatase type], and 2 parts by mass of a 50% aqueous solution of tetrabutylammonium bromide [TBAB-50A manufactured by Lion Specialty Chemicals Co., Ltd.] as the quaternary ammonium salt and kneading was performed using a 3 L kneader and an open roll to prepare a rubber composition.

The blending proportion of the effective component (tetrabutylammonium bromide) in the aqueous solution was 1 part by mass with respect to 70 parts by mass of the solids (EPDM) in the oil-extended EPDM plus 30 parts by mass of IR, in other words, 100 parts by mass of the total amount of the rubber components and 5 parts by mass with respect to the 100 parts by mass of the amorphous silica.

Comparative Example 3

Besides not blending a quaternary ammonium salt, a rubber composition was prepared in the same manner as in Example 6.

Example 7

Oil-extended EPDM [the aforementioned Esprene 670F manufactured by Sumitomo Chemical Co., Ltd., oil extended amount: 100 phr] was used as the rubber component.

Two hundred parts by mass [solids (EPDM): 100 parts by mass] of the oil-extended EPDM were blended with 3 parts by mass of dicumyl peroxide [the aforementioned Percumyl D manufactured by NOF Corporation] as the peroxide crosslinking agent, 5 parts by mass of amorphous silica [the aforementioned Nipsil VN3 manufactured by Tosoh Silica Corporation], 0.5 parts by mass of carbon black [the aforementioned Diablack H manufactured by Mitsubishi Chemical Corporation], 5 parts by mass of titanium oxide [the aforementioned SA-1 manufactured by Sakai Chemical Industries Co., Ltd., anatase type], and 0.4 parts by mass of the 50% aqueous solution of tetrabutylammonium bromide [TBAB-50A manufactured by Lion Specialty Chemicals Co., Ltd.] as the quaternary ammonium salt and kneading was performed using a 3 L kneader and an open roll to prepare a rubber composition.

The blending proportion of the effective component (tetrabutylammonium bromide) in the aqueous solution was 0.2 part by mass with respect to 100 parts by mass of the solids (EPDM) in the oil-extended EPDM and 4 parts by mass with respect to the 100 parts by mass of the amorphous silica.

Example 8

Besides setting the amount of the amorphous silica to 20 parts by mass and blending 0.2 parts by mass of the 50% aqueous solution of benzyltributylammonium chloride [the aforementioned BTMAC-50A manufactured by Lion Specialty Chemicals Co., Ltd.] as the quaternary ammonium salt, a rubber composition was prepared in the same manner as in Example 7.

The blending proportion of the effective component (benzyltributylammonium chloride) in the aqueous solution was 0.1 parts by mass with respect to 100 parts by mass of the solids (EPDM) in the oil-extended EPDM and 0.5 parts by mass with respect to the 100 parts by mass of the amorphous silica.

Example 9

Besides setting the amount of the amorphous silica to 30 parts by mass and blending 4 parts by mass of the 50% aqueous solution of benzyltributylammonium chloride [the aforementioned BTMAC-50A manufactured by Lion Specialty Chemicals Co., Ltd.] as the quaternary ammonium salt, a rubber composition was prepared in the same manner as in Example 7.

The blending proportion of the effective component (benzyltributylammonium chloride) in the aqueous solution was 2 parts by mass with respect to 100 parts by mass of the solids (EPDM) in the oil-extended EPDM and 6.7 parts by mass with respect to the 100 parts by mass of the amorphous silica.

Comparative Example 4

Besides setting the amount of the amorphous silica to 20 parts by mass and not blending in a quaternary ammonium salt, a rubber composition was prepared in the same manner as in Example 7.

Comparative Example 5

Besides setting the amount of the amorphous silica to 20 parts by mass and blending 0.1 parts by mass of the 50% aqueous solution of benzyltributylammonium chloride [the aforementioned BTMAC-50A manufactured by Lion Specialty Chemicals Co., Ltd.] as the quaternary ammonium salt, a rubber composition was prepared in the same manner as in Example 7.

The blending proportion of the effective component (benzyltributylammonium chloride) in the aqueous solution was 0.05 parts by mass with respect to 100 parts by mass of the solids (EPDM) in the oil-extended EPDM and 0.25 parts by mass with respect to the 100 parts by mass of the amorphous silica.

<Evaluation of Moldability>

When the moldability was evaluated upon subjecting the rubber compositions prepared in Examples 6 to 9 and Comparative Examples 3 to 5 to press crosslinking under the conditions of 170° C.×20 minutes, the moldability was found to be satisfactory (°) with Examples 6 to 9 and Comparative Example 3 and therefore the characteristics of these were evaluated by performing the following respective tests as well as the hardness test, tensile test, and compression set test described above. However, the rubber compositions of Comparative Examples 4 and 5 could not be crosslinked and molded satisfactorily and therefore these were evaluated to be poor (×) in moldability and were not subject to the respective tests mentioned above.

<Compression Set Test>

Each of the rubber compositions prepared in Examples 6 to 9 and Comparative Example 3 was press crosslinked under the conditions of 170° C.×20 minutes to be made into a sheet form of 2 mm thickness and was further punched out to prepare a strip shaped test piece as defined in Japanese Industrial Standards JIS K6273:$_{2006}$ "Rubber, vulcanized or thermoplastic—Determination of tension set, elongation and creep."

Using the test piece, the tension set at constant elongation $TS_E(\%)$ was determined under an environment of 23±2° C. temperature and conditions of test time of 24 hours and elongation applied to test piece of 100% in accordance with the test method cited in the abovementioned Standards.

<Preparation of Paper Feeding Roller>

With each of the rubber compositions prepared in Examples 6 to 9 and Comparative Example 3, transfer molding to a cylindrical shape was performed under the conditions of 170° C.×20 minutes, and in a state where a shaft 3 of 17 mm outer diameter was press-fitted into a through hole 2, polishing to an outer diameter of 23 mm using a cylindrical grinder followed by cutting to a width of 30 mm was performed to prepare a paper feeding roller 1.

<Friction Coefficient Test>

Figure 2:
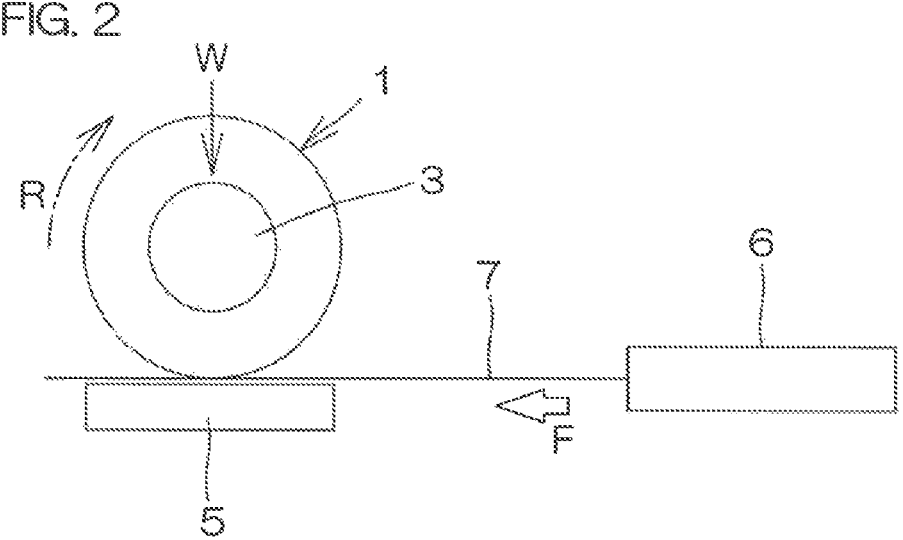
FIG. 2 is a diagram for describing a method for measuring a friction coefficient of paper feeding rollers prepared using Examples and Comparative Examples of the present invention.

As shown in FIG. 2, a plate 5 made of polytetrafluoroethylene (PTFE) was set horizontally, a sheet of paper 7 [P paper (plain paper) manufactured by Fuji Xerox Co., Ltd.] of 60 mm×210 mm size was set with one end connected to a load cell 6 and the other end being sandwiched between the plate 5 and the paper feeding roller 1, and in this state, a vertical load W of 1.18N (=120 gf) was applied to the shaft 3 of the paper feeding roller 1 as indicated by a solid line arrow in the figure.

In this state, the paper feeding roller 1 was rotated at a circumferential speed of 300 mm/second in the direction indicated by an alternate long and short dash line arrow R under an environment of 23±2° C. temperature and 55±10% relative humidity to measure a conveying force F (gf) applied to the load cell 6.

From the measured conveying force F and the vertical load W (−120 gf), the frictional coefficient μ was determined using formula (1):

[Mathematical formula 1]

$$\mu = F(gf)/W(gf) \quad (1)$$

The results of the above are shown in Table 3 and Table 4.

TABLE 3

| | | | Example 6 | Comparative Example 3 |
|---|---|---|---|---|
| Part by mass | Rubber component | EPDM | 70 | 70 |
| | | IR | 30 | 30 |
| | Peroxide crosslinking agent | | 3 | 3 |
| | Reinforcing agent | Amorphous silica | 20 | 20 |
| | | Carbon black | 0.5 | 0.5 |
| | | Titanium oxide | 5 | 5 |
| | Quaternary ammonium salt (effective component) | TBAB-50A | 1 | — |
| | | With respect to 100 parts by mass of amorphous silica | 5 | — |
| Evaluation | Moldability | | ○ | ○ |
| | Type A durometer hardness | | 42 | 39 |
| | Tensile test | TS (MPa) | 7.2 | 9.8 |
| | | $E_b$ (%) | 620 | 840 |
| | Compression set (%) | | 14 | 34 |
| | Tension set at constant elongation $TS_E$ (%) | | 12 | 20 |
| | Friction coefficient μ | | 1.9 | 1.9 |

TABLE 4

| | | | Comparative Example 4 | Comparative Example 5 | Example 8 | Example 7 | Example 9 |
|---|---|---|---|---|---|---|---|
| Part by mass | Rubber component | EPDM | 100 | 100 | 100 | 100 | 100 |
| | Peroxide crosslinking agent | | 3 | 3 | 3 | 3 | 3 |
| | Reinforcing agent | Amorphous silica | 20 | 20 | 20 | 5 | 30 |
| | | Carbon black | 0.5 | 0.5 | 0.5 | 0.5 | 0.5 |
| | | Titanium oxide | 5 | 5 | 5 | 5 | 5 |
| | Quaternary ammonium salt (effective component) | TBAB-50A | — | — | — | 0.2 | — |
| | | BTMAC-50A | — | 0.05 | 0.1 | — | 2 |
| | | With respect to 100 parts by mass of amorphous silica | — | 0.25 | 0.5 | 4 | 6.7 |
| Evaluation | Moldability | | x | x | ○ | ○ | ○ |
| | Type A durometer hardness | | — | — | 37 | 30 | 39 |
| | Tensile test | TS (MPa) | — | — | 9.0 | 4.5 | 8.5 |
| | | $E_b$ (%) | — | — | 800 | 810 | 810 |
| | Compression set (%) | | — | — | 17 | 13 | 15 |
| | Tension set at constant elongation $TS_E$ (%) | | — | — | 10 | 8 | 10 |
| | Friction coefficient μ | | — | — | 2.1 | 2.2 | 2.0 |

The results for Comparative Example 3 shown in Table 3 show that, with a system using the EPDM and the IR in combination as the rubber components and using the three types of reinforcing agent including the peroxide crosslinking agent and the amorphous silica, the rubber components can be crosslinked to some degree even if a quaternary ammonium salt is not blended. However, it was found that the degree of crosslinking is insufficient such that the mechanical characteristics are degraded and in particular, the compression set and the tensile set are high such that a defect, such as deformation due to press contact, idle rotation, etc., occurs readily.

In contrast, from the results for Example 6, it was found that by blending a quaternary ammonium salt in the same system to crosslink the rubber components sufficiently, the mechanical characteristics can be improved and the compression set and the tension set can be made to low to make a defect, such as deformation due to press contact, idle rotation, etc., unlikely to occur.

Also, from the results for Examples 7 to 9 and Comparative Examples 4 and 5 in Table 4, it was found that even in a system using the EPDM as the rubber component and using the three types of reinforcing agent including the peroxide crosslinking agent and the amorphous silica, the EPDM can be crosslinked satisfactorily and a rubber molded article that is excellent in mechanical characteristics, such as tensile characteristics, strain resistance characteristics, etc., can be formed by blending a quaternary ammonium salt at an amount of not less than 0.3 parts by mass with respect to 100 parts by mass of the amorphous silica.

The invention claimed is:

1. A paper feeding roller having an outer peripheral surface formed of a rubber composition,
   the rubber composition comprising: at least a rubber component, which includes an ethylene propylene diene rubber; not less than 1 part and not more than 5 parts by mass of a peroxide crosslinking agent with respect to 100 parts by mass of the rubber component; and not less than 1 part and not more than 80 parts by mass of amorphous silica with respect to 100 parts by mass of the rubber component; and further comprising: not less than 0.3 parts and not more than 10 parts by mass of a quaternary ammonium salt with respect to 100 parts by mass of the amorphous silica,
wherein the quaternary ammonium salt is any one of benzyltributylammonium chloride, an alkyl (C12 to C16) trimethylammonium chloride, or tetrabutylammonium bromide.

2. The paper feeding roller according to claim 1, wherein the quaternary ammonium salt is blended in the state of a solution.

\* \* \* \* \*